United States Patent [19]
Kraus

[11] 3,728,486
[45] Apr. 17, 1973

[54] VOICEGRAM SERVICE

[76] Inventor: Constantine Raymond Kraus, 845 Mount Moro Road, Villanova, Pa. 19085

[22] Filed: Aug. 26, 1971

[21] Appl. No.: 175,069

[52] U.S. Cl. ................179/2 R, 179/7.1 TP, 179/27, 179/6 C, 179/5.5
[51] Int. Cl. ..............................................H04m 11/00
[58] Field of Search ........................179/2 R, 2 DP, 3, 179/5.5, 6 C, 7 MM, 7, 7.1 TP, 27

[56] References Cited

UNITED STATES PATENTS 3,111,561 11/1963 Dunning..................................179/27
3,394,229 7/1968 Miller..............................179/7.1 TP

*Primary Examiner*—Ralph D. Blakeslee
*Attorney*—Joseph Gray Jackson

[57] ABSTRACT

A voicegram service center for use with a telephone system, including recording as an analog signal at the service center, a voicegram of spoken words or data (datagram) received from a sending telephone subscriber's set, delivering to a preselected receiving telephone subscriber's set a reproduction voicegram in the sender's voice or reproduction data (datagram) as derived from the recorded analog signal at the service center, providing at the service center a cassette replica of the reproduction voicegram or data as delivered to the receiving set, and providing at the service center information pertaining to the identifying numbers of the respective sending and receiving sets, the originating time and date of the voicegram or data, the time length of the voicegram or data recording, the delivery time and date of the reproduction voicegram or data, the number of attempts required to make the reproduction voicegram or data delivery, the time length of the reproduction voicegram or data delivery, and the class of the voicegram or data for computing the charge of the voicegram or data to the sending set.

33 Claims, 4 Drawing Figures

VOICEGRAM SERVICE

BACKGROUND OF THE INVENTION

This invention relates to a method of and apparatus for a voicegram service center, and more specifically to such center adapted for use with a telephone system.

A need presently exists for a rapid, accurate and reliable voicegram service for the home, commerce, and government. The past several decades in time have seen a decline in the number of telegrams handled annually from the order of 200 million to the order of 50 million. This decline may be attributed primarily to the development and the expansion of various types of telephone services. Prior to 1946, letter mail was the principal link of communication for the home, business and government communities with the telephone, teletype and telegrams used as less frequent adjuncts to the mail. Today, the telephone has replaced the mail as the principal avenue of communications among people by an overwhelming margin, with the mail and teletype as respectively second and third choices. The telegram is now a relatively rarely used fourth choice since the advent of data and facsimile transmission.

This drastic change in the method of communication among people may be traced to substantial decreases in the time required for achieving local and long distance telephone calls, coupled with an extraordinary improvement in voice transmission and lower cost thereof. It is a well-known historical fact that shortly after World War II, i.e., approximately in the years from 1946 to 1955, telephone calls were completed in a time period involving several minutes to several hours, depending on the geographical locations of the calling and called parties. Today in an era of modern technology, telephone connections may be completed in a time period of the order of 10 seconds for short hauls up to approximately 180 miles and 17 or 18 seconds for calls exceeding 1,000 miles. It is to be noted that the only major change made in recent times to speed up the handling of a telegram is in the use of a telephone to replace the hand delivery of the telegram to the addressee thereof by a messenger boy. It would thus appear to be clear that the use of the telegram for communication in modern society is due for a further decline with a consequent decrease in revenue therefrom.

It is therefore contemplated by the present invention to speed up the delivery of a voicegram in a telephone system to such extent as to place it speed-wise in the same class with a telephone call.

A principal object of the invention is to deliver a voicegram originating at a sending telephone set in a telephone system as a reproduction of the sender's voice to a preselected receiving telephone set in the same system.

Another object is to improve the time delivery of a voicegram to a receiving telephone set in a telephone system.

A further object is to insure verbatim delivery of a voicegram to a receiving telephone set in a telephone system.

An additional object is to deliver a voicegram in a sender's voice to a receiving telephone set in a telephone system.

Still another object is to provide automatic delivery of a voicegram to an addressee called at a receiving telephone set in a telephone system.

A still further object is to provide semi-automatic delivery of a voicegram to an addressee called at a receiving telephone set in a telephone system.

Another object is to deliver a voicegram in the sender's voice to a particular addressee called at a receiving telephone set in a telephone system.

A further object is to deliver to the sender and/or the addressee by mail or the like a recorded replica of the sender's voicegram.

Another object is to deliver a voicegram to a receiving telephone set at a definite time as specified by a sender at a sending telephone set.

Still another object is to send a voicegram comprising data produced for telephone transmission.

A still additional object is to provide automatic billing to a sending telephone set of a voicegram or data delivered to an addressee called at a receiving telephone set in a telephone system.

SUMMARY OF THE INVENTION

These and other objects are achieved in accordance with a specific embodiment of the invention in FIGS. 1, 2, 3 and 4, representing a voicegram service center independent of but adapted to operate on an automatic basis in a modern automatic telephone system and including an analog recorder-reproducer for recording the voicegram originating in a sending subscriber's telephone set and reproducing it in the sender's voice for delivery to a preselected receiving telephone subscriber's set, and a computer controlling the recording of the voicegram and the delivery thereof and thereafter utilizing information pertaining to the number of the respective sending and receiving sets, the originating time and date of the sending set voicegram, the time length of the voicegram recording, the delivery time and date of the reproduction voicegram to the receiving set, the number of attempts required to make such delivery, the time length required for the reproduction voicegram delivery, and the class of voicegram for computing a charge to the sending set for the voicegram recording and the reproduction voicegram delivery. The class of message includes, for example, immediate delivery, delivery at a specific time, delivery to a particular person, delivery of a cassette recording to the sender or addressee.

A specific embodiment of the invention utilizes sending and receiving telephone sets operating through sending and receiving telephone central offices which are controlled by signals originating in the sending set and in a programmed computer included in the voicegram service center. The sending set wishing to send a voicegram of certain length initially transmits a predetermined prefix number of signal pulses followed by another predetermined number of signal pulses identifying a preselected receiving set to activate one or more sending central offices to connect the sending set therethrough to the voicegram service center. The sending central office interprets the prefix signal pulses as an indication the sending set is to send a voicegram, whereupon the sending set is connected to the voicegram service center. The transmitted signal pulses identifying the receiving set and other signal pulses identifying the sending set are initially recorded in a register-sender means in the sending central office and later transmitted to the voicegram service center for storing in signal pulse registers included therein. After both the sending and receiving set identifying signal pulses are stored in the signal pulse registers, a talking circuit is completed between the sending set and the computer. This enables the computer to connect temporarily an operator's position to the sending set whereby an operator may request verbally any special instructions such for example, as the class, the delivery time and the like for the voicegram. After such instructions are received and stored, the computer disconnects the operator's position from the talking circuit. The computer then informs the sending set via a recorded preselected voice request sent on the talking circuit to speak the voicegram into the sending set upon which occurrence the spoken voicegram is recorded as an analog signal in a recorder-reproducer located in the service center.

Upon completion of the voicegram recording, the sending set is disconnected from the sending central office as well as from the voicegram service center whereupon the computer causes an automatic call unit to transmit the stored signal pulses identifying the preselected receiving set to a receiving telephone central office, thereby activating a signaling connection through one or more additional receiving central offices to energize the particular receiving set which thereupon goes off-hook. This completes another talking circuit which enables the computer to supply a recorded preselected voice statement thereon to inform the particular receiving set that a voicegram is awaiting delivery thereto whereupon the computer activates the recorder-reproducer to deliver a voice reproduction of the analog signal recorded therein to the preselected receiving set. This set indicates its satisfaction with delivery of the voicegram reproduction by going on-hook. At this time the receiving set is disconnected from the several receiving central offices included in the talking circuit and thereby from the voicegram service center. Now the computer programmed to utilize the above-identified pertinent voicegram information produces the data necessary to charge the sending set for the recording and delivery of the reproduction voicegram to the preselected receiving set.

One modification of the invention in FIGS. 1, 2, and 3 adapted for one type of semi-automatic operation of the voicegram service center involves a further use of the operator's position thereat. This use enables the operator to request the sending set to supply the number thereof. After receiving the number, the operator dials the sending set number as signal pulses into the signal registers for storage therein, the latter registers having automatically stored therebefore the signal pulses identifying the receiving set. Otherwise, the operation of FIGS. 1, 2 and 3 is identical with that previously described. This semi-automatic operation is useful where the telephone central office servicing the sending set does not include CAMA (Centralized Automatic Message Accounting) with ANI (Automatic Number Identification).

A second modification of the invention in FIGS. 1, 2 and 3 adapted for another form of semi-automatic operation involves the use of the operator's position to enable the operator to request the sending set to supply the telephone numbers of both the receiving and the sending sets. After receiving such numbers the operator dials them as corresponding signal pulses into the signal pulse registers for storage therein. Otherwise, the operation of FIGS. 1, 2 and 3, is identical with that previously described. This semiautomatic operation is useful where the sending telephone central office is not arranged to respond to the predetermined prefix number of pulses. This operation utilizes a seven to ten digit code to establish a talking connection from the sending set to the voicegram service center.

A third modification of the invention in FIGS. 1, 2 and 3 adapted for a third type of semi-automatic operation concerns the use of the operator's position to enable the operator to verify at the preselected receiving set the identity of a particular addressee to whom the voicegram is directed as per instructions before the voicegram reproduction is delivered to the receiving set.

A fourth modification related to the use of FIG. 4 in FIGS. 1, 2 and 3 involves the provision of touch-tone equipment at the sending set and at the voicegram service center for enabling the sender to provide at the voicegram service center specific instructions regarding the class and the delivery of the voicegram to the receiving set.

A fifth modification in FIGS. 1, 2 and 3 provides cassette replicas of the voicegram as recorded in the voicegram service center for the sender and addressee.

A voicegram (telegram message) as used herein is understood to mean a voicegram originated by a party at a sending telephone set in a telephone system and in the sending party's voice for one specific length of time at a voicegram service center independent of the telephone system but connectable therein for delivery at a subsequent time from the voicegram service center as a reproduction of the sending party's voice for a second specific length of time to a preselected receiving telephone set in the telephone system. This voicegram may also comprise data generated for telephone use; and when the voicegram is exclusively formed of data, it is known as a datagram.

BRIEF DESCRIPTION OF THE DRAWING

The invention is readily understood from the following description when read together with the accompanying drawing in which.

DETAILED DESCRIPTION

Figure 1:
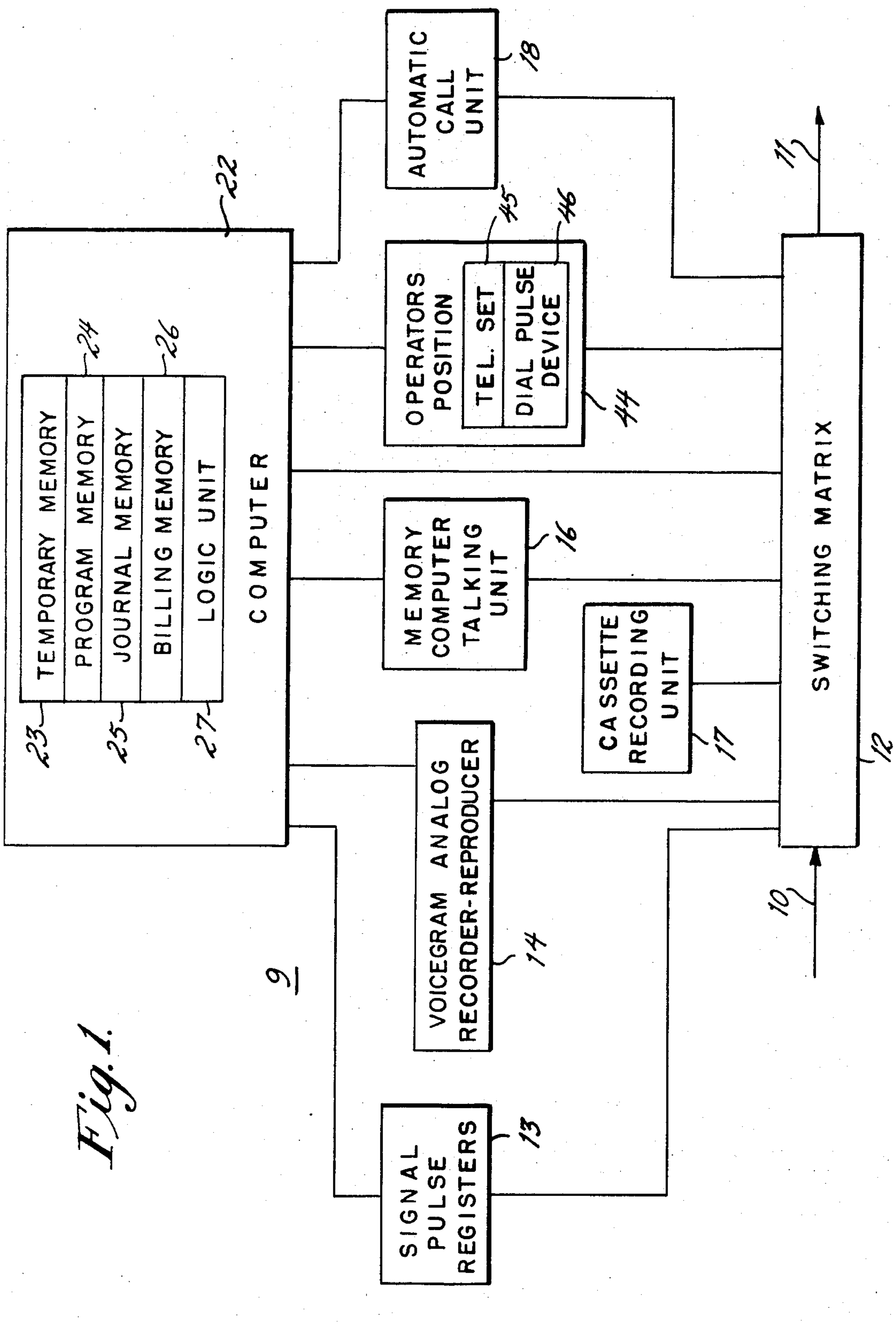
FIG. 1 is a block diagram of a specific embodiment of the invention adapted for use in FIG. 2 or 3.

FIG. 1 shows a specific embodiment of the invention comprising an automatic voicegram service center 9 including a switching matrix 12 controlled by a computer 22 for utilizing an incoming telephone truck 10 and an outgoing telephone line 11 for purposes hereinafter specified. This center also includes signal pulse registers 13, a voicegram analog recorder-reproducer 14, a memory computer talking unit 16, a cassette recording unit 17, an automatic call unit 18, and an operator's position 44 interconnected with the switching matrix and the computer for the purposes later mentioned. The talking unit is permanently programmed to state vocally: "This is your voicegram service center; begin speaking your message into your telephone set at the sound of the next tone" at one time and "This is your voicegram service center; we have a voicegram that will be repeated until you hang up" at another time as subsequently described.

The computer is an electronic type for the purpose of this explanation, comprising a temporary memory 23, a program memory 24, a journal memory 25, a billing memory 26, a logic unit 27, and circuit control equipment, not shown.

The temporary memory records data pertaining to individual voicegrams, including: (1) identifying numbers of sending and receiving telephone sets, and (2) special instructions regarding the delivery of individual voicegrams as hereinafter identified.

The program memory contains data pertaining to instructions common to all voicegrams, including: (1) activating the talking unit to state to the sending telephone set, "This is your voicegram service center; begin speaking your voicegram into your telephone set after the sound of the next tone;" (2) activating the talking unit to tell the preselected receiving set: "This is your voicegram service center; we have a voicegram which will be repeated for you until you hang up;" (3) a program for controlling a sequence of circuit operations required for the recording and delivery of each voicegram, and (4) such additional circuit functions as are necessary to effectuate special instructions pertinent to each voicegram as received from the temporary memory as below mentioned.

The journal memory activated by the program memory records pertinent details (as later identified herein) of the operations which have taken place during a given time interval covering the recording and delivery of each voicegram. Such recording is erased from the journal memory which is then restored to service for a next succeeding time interval.

The billing memory records: (1) the telephone number of the sending set of each voicegram, (2) the telephone number of the receiving set of each reproduction voicegram, (3) the originating time and date of each voicegram, (4) the time length of each voicegram recording, (5) the delivery time and date of each reproduction voicegram (6) the number of attempts made to complete delivery of each reproduction voicegram, (7) the time length required for each reproduction voicegram delivery, and (8) the class of each voicegram. The billing memory also stores permanent data for effectuating the sending set service charge, together with the computation of data received from the operation of the logic unit and the stored permanent data.

The logic unit responsive to the pertinent data supplied by the foregoing several memories for each voicegram enters in the billing memory the information therein as just mentioned coupled with the computed charge.

Figure 2:
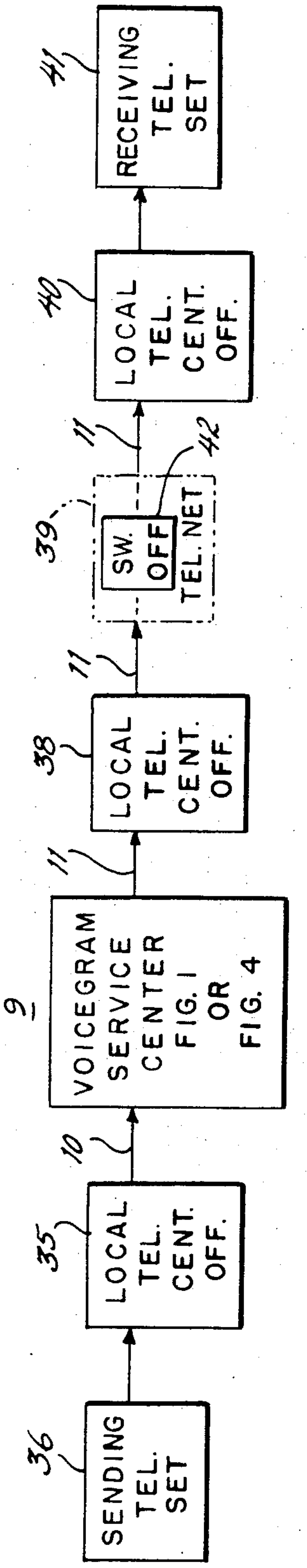
FIG. 2 is a block diagram of the invention in FIG. 1 connected through a local telephone central office to a sending telephone set and through a telephone network including local telephone central and switching offices to a receiving telephone set in a telephone system.

FIG. 2 illustrates the voicegram service center having an input connected via the telephone trunk 10 and a telephone central office 35 to a sending telephone set 36 and an output connected through the telephone line 11, a telephone central office 38, a conventional telephone switching network 39, and a telephone central office 40 to a receiving telephone set 41. This network includes a switching office 42 in such number as is required for a given circuit to utilize the sending and receiving sets in accordance with the invention as disclosed herein. It is understood in FIGS. 1 and 2 that the voicegram service center may not be necessarily owned and operated by a telephone company but may be owned, controlled and serviced by a company independent of telephone companies and devoted exclusively to the traffic of voicegrams in the manner described herein. It is additionally understood that the sending set is located in a domestic area while the receiving set may be located in a domestic area or in a foreign area. It is also understood that line 11 may terminate in a foreign local central office located several thousand miles distant from the sending set. It is further understood that the sending and receiving sets may be equipped with familiar dial pulse devices (including touch-tone) to identify the digits in a given multidigit telephone number for a purpose mentioned below.

Figure 3:
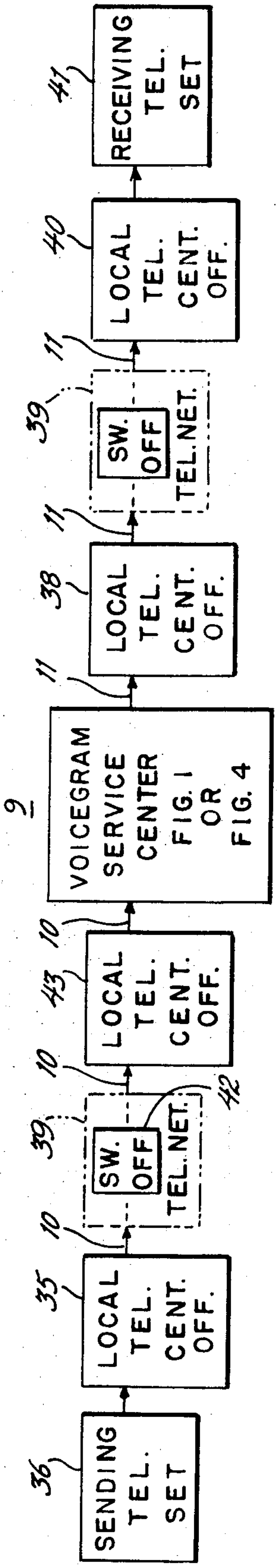
FIG. 3 is a block diagram of a telephone system embodying the invention in FIG. 1 connected through telephone networks including local telephone central and switching offices to the sending and receiving telephone sets in a telephone system.

FIg. 3 is similar to FIG. 2 except the former includes the voicegram service center having an input connected via local telephone central office 43, another telephone network 39, and telephone central office 35 to the sending set and an output connected via the line 11 in the manner of FIG. 2 to the receiving set.

AUTOMATIC SENDING OF VOICEGRAM FROM SENDING SET TO VOICEGRAM SERVICE CENTER

The operation of the invention in FIG. 1 as used with FIG. 2 or 3 is effected in the following manner. The sending set going off-hook awaits the reception of dial tone sent from local central office 35, and thereafter upon such reception dials a predetermined prefix signal consisting of two or three digits in signal pulse form, which is similar to the digits used for international dialing, followed by the telephone number consisting of seven or 10 digits in signal pulse form signifying a local or a distant preselected receiving set to which the voicegram is to be delivered. The prefix signal and the receiving set number are transmitted in sequence as an incoming call to local telephone central office 35 in which register-sender means or an appropriate similar device commonly used in the modern telephone plant, but not shown herein in the interest of a simplified disclosure, interprets the prefix signal as an indication that a voicegram is to be sent. Thereupon, the local central office effects the following actions: (1) routes the incoming call directly on a selected telephone trunk 10 assigned to the voicegram service center, and (2) at the same time stores the receiving and sending set numbers in this sequence in the register-sender means. This action is similar to that utilized in the operation of a local central office with a No. 1 TSPS (traffic service position system) which is well known in the art and is disclosed in an article entitled the TSPS No. 1 System — Organization and Objectives, by Jaeger and Joel Vol. 49 Bell System Technical Journal, December, 1970, No. 10, pages 2,435 and 2,436; and in an article entitled TSPS No. 1 — Operational Programs — ANI (automatic number Identification) Digit Analysis, by Kettley, Pasternak and Sikorsky, Vol. 49, Bell System Technical Journal, December, 1970, No. 10, page 2,632.

After the selection of trunk 10, the computer recognizing the incoming call activates the switching matrix to connect trunk 10 to an available signal pulse register. Upon the completion of the connection a circuit is thus completed on trunk 10 between the register-sender means of the central office 35 and the available signal pulse register.

For the purpose of this description, local central office 35 is assumed to be a component of an existing telephone system such, for example, as the No. 1 ESS system (electronic switching system) including a stored program control, as disclosed in the Bell Laboratories Record, June, 1965. The computer is essentially disclosed as a component of the No. 1 ESS system, supra. As an alternative the local central office 35 may embody either a No. 1 or a No. 5 crossbar switching system manufactured by the Western Electric Company and having originating registers to recognize the prefix digits for routing an incoming voicegram to the voicegram service center. The talking unit used for purposes identified hereinafter is essentially a component of the International Business Machines No. 7770 computer.

Upon completion of the circuit between the register-sender means of central office 35 and the available signal pulse register as just mentioned, central office 35 responsive to a program included therein automatically transmits signal pulses identifying the numbers of the preselected receiving set and of the sending set on trunk 10 to the signal pulse register for registration therein. This known as automatic number identification (ANI) is a component of the centralized automatic message accounting (CAMA) system provided as an adjunct to the traffic service position system TSPS, supra. The signal pulse registers may be of a type designed to receive multi-frequency signal pulses as described in an article entitled "Incoming Register Circuits for No. 5 Crossbar, " by R. K. McAlpine and published in Bell Laboratories Record, March, 1950, page 426, as well as in the No. 1 TSPS system, supra. When this transmission is completed, central office 35 automatically disconnects the register-sender means therein from trunk 10, and completes therethrough a talking circuit from the sending set via trunk 10 to the switching matrix. Now the computer, recognizing that a voicegram is about to be recorded, connects the operator's position to the temporary memory and to the switching matrix and thereby to trunk 10 and the sending set in the talking circuit previously described. At this time the operator's position goes off-hook to request the sending party at the sending set to indicate: (a) class of voicegram (i.e., delivery at once or at a specific time), (b) delivery to anyone at the receiving set, (c) delivery to a particular person at the receiving set, or (d) the making of a cassette record. The operator actuates the dial pulse device 46 to store the instruction in the temporary memory and thereafter goes on-hook, whereby the switching matrix is activated to disconnect the operator's position from the last-mentioned talking circuit. Next, the computer activates the switching matrix to connect the signal pulse registers to read out therefrom the signal pulses identifying the sending and receiving sets into the recorder-reproducer and the temporary memory, and then disconnects the signal pulse registers from trunk 10 and the temporary memory from the switching matrix.

At this time, the computer connects the memory computer talking unit to the switching matrix and thereby to trunk 10 and the sending set in the talking circuit above identified whereupon the talking unit announces "This is your voicegram service center; begin speaking your message into your telephone set upon the sound of the tone," as previously mentioned. Then the computer activates the switching matrix to disconnect the memory computer tacking unit from trunk 10 and at the same time to connect the recorder-reproducer thereto and to record the starting time of the voicegram recording. Upon hearing the tone, the party at the sending set speaks the voicegram thereinto, whereupon the corresponding analog signal is recorded in the recorder-reproducer. Having completed the speaking of the voicegram into the sending set, the sending party returns it to on-hook. At this point, the computer records the time of the on-hook and thereby the terminating time of the voicegram recording. This terminates the connection of the sending set through the central office 35 and trunk 10 to the voicegram service center, thereby interrupting the afore-mentioned talking circuit therebetween. Meanwhile, the computer activates the switching matrix to connect the temporary memory to the recorder-reproducer and then energizes the temporary memory to transfer therefrom to the recorder-reproducer information pertaining to the voicegram and including delivery-at-once (for example) and the calculated time length of the voicegram recording as derived from the starting and terminating times thereof previously mentioned. This transferred information is recorded on a separate sound track associated with the voicegram track upon which the voicegram of the sending set is being recorded. At this time, the computer activates the switching matrix to disconnect the recorder-reproducer from trunk 10.

Although the foregoing describes the transmission and recording of a voicegram comprising a sending party's spoken words, it is apparent that data generated for telephone transmission may be substituted for such spoken words thereby constituting a datagram. For this purpose a data generator may be coupled to the sending set in the well-known manner, and may comprise, for example, a No. 201-A Data Set manufactured by the Western Electric Co.

AUTOMATIC DELIVERY OF VOICEGRAM FROM VOICEGRAM SERVICE CENTER TO RECEIVING SET

At the moment, it is assumed that a delivery at-once instruction applies to the voicegram as stored in the recorder-reproducer, and as a consequence the temporary memory has such instruction. Now, the program memory activates the temporary memory to read out the sending and receiving set numbers therefrom into the program memory. The computer activates the switching matrix to select outgoing line 11 which is idle and terminating in central office 38 and at the same time connects the automatic call unit to line 11 and the program memory. Now, line 11 sends dial tone to the automatic call unit which thereupon transmits signal pulses corresponding to the preselected receiving set on line 11 from the program memory to central office 38. These signal pulses are so interpreted by central office 38 as to connect the voicegram message service center through the switching matrix, central office 38, switching office 39 and central office 40 to energize the receiving set. As this set is assumed to be idle at the moment, it goes off-hook, in response to the signal pulses, thereby completing a talking circuit from the voicegram service center to the receiving set as just identified. If this set did not answer (because it is busy or unattended at the moment), the program memory is programmed so that the computer will repeat the process at preassigned time intervals in a given overall time period.

When the idle preselected receiving set goes off-hook, local terminating central office 40 returns an answer-supervision signal pulse via switching office 39 to local central office 38. This office is activated by the signal pulse to record the starting time of the telephone call to receiving set for normal charging purposes by the telephone company. Simultaneously, the trunk circuits in central office 38 transmit a corresponding signal pulse on line 11 to the computer to represent the preselected receiving set off-hook state. Upon receipt of this pulse, the computer actuates the switching matrix to connect the memory computer talking unit to a talking circuit including the switching matrix, line 11, local central office 38, switching office 39, terminating central office 40, and the particular receiving set whereby the program memory stimulates the memory computer talking unit to transmit the second preselected permanent recording thereon, viz., "This is your voicegram service center; we have a voicegram which will be repeated until you hang up" as previously mentioned. Now, the computer activates the switching matrix to connect the recorder-reproducer to line 11 and thereby to the preselected receiving set via the talking circuit previously traced, and at the same time to disconnect the memory computer talking unit from the talking circuit. The program memory next activates the recorder-reproducer to transmit a voice reproduction of the voicegram as spoken into the sending set and to repeat indefinitely this voicegram reproduction to the receiving set via the talking circuit just traced. In due course, the party at the preselected receiving set satisfied the voicegram reproduction has been fully and accurately received restores the receiving set to on-hook.

When the preselected receiver set goes on-hook, a corresponding signal is returned from terminating central office 40 via switching office 39 to local office 38 to record the terminating time of telephone call to the receiving set for the normal charging purposes by the telephone company. Simultaneously, the trunk circuits in central office 38 transmit a corresponding signal pulse on line 11 to the computer to represent the preselected receiving set on-hook state. Upon receipt of this pulse, the computer activates the switching matrix to disconnect the service center from line 11 thereby interrupting the afore-traced talking circuit to the receiving set. The time interval between the off-hook and on-hook states of the preselected receiving set as just mentioned constitutes the deliver time of the reproduction voicegram. It is thus apparent that the actual basic charge of the delivered voicegram comprises: (a) the time length of recording the voicegram in the recorder-reproducer plus (b) the time length of the reproduction voicegram delivery.

Now, the program memory directs the following information pertaining to the voicegram to be recorded in the journal memory: (1) the telephone number of the sending set, (2) the telephone number of the receiving set, (3) the originating time and date of the voicegram at the sending set, (4) the time length of the voicegram as recorded in the recorder-reproducer, (5) the time and date of the delivery of the reproduction voicegram to the receiving set, (6) the number of attempts made to deliver the reproduction voicegram, (7) the time length required for the reproduction voicegram delivery, and (8) the class of voicegram. Further, the program memory directs the transfer of the pertinent information recorded in the journal memory into the billing memory and the logic unit for producing at the billing memory the data required to charge the sending set for the delivery of the reproduction voicegram to the receiving set. For this purpose the program memory is permanently programmed to include programs similar to the well-known programs (automatic message accounting) utilized by telephone companies for billing telephone charges in the manner now well-known in the art.

The data output of the billing memory includes the foregoing information contained in the journal memory together with the charge computed by the logic unit for the reproduction voicegram as delivered to the receiving set. This data output of the billing memory is forwarded to a telephone company accounting office which supplies it into its billing computer for billing the cost of the delivered voicegram to the sending set. When the voicegram comprises data (i.e., is a datagram,) the receiving telephone set is coupled in the well-known manner to the data receiver set, supra.

ONE TYPE OF SEMI-AUTOMATIC SENDING OF VOICEGRAM MESSAGE FROM SENDING SET TO RECEIVING SET

FIG. 1 designed to provide semi-automatic operation of the voicegram service center includes the operator's position 44 for a purpose presently mentioned. This operation is used in cases in which the central office 35 in FIGS. 2 and 3 is not equipped to transmit automatically the signal pulses representing the number of the sending set as hereinbefore mentioned.

In accordance with this operation of the operator's position, the off-hook sending set dials the predetermined prefix digits and the preselected 7 or 10 digit receiving set number to store the latter number temporarily in central office 35 and to connect this office via trunk 10 to the switching matrix and to the available signal pulse registers at the service center, whereupon the signal pulses representing the receiving set number are automatically transmitted from central office 35 for storage in the signal pulse registers at the service center as previously described. Now the computer actuates the switching matrix to connect the operator's position to trunk 10. Upon energization of the operator's position, the telephone set thereat goes off-hook thereby completing a talking circuit from the operator's position telephone set via the switching matrix, trunk 10 and central office 35 to the sending set.

This talking circuit enables an operator at the operator's position to request the identifying number of the sending set and special instructions regarding the voicegram from the party at the sending set. At the same time the operator's position is connected through the switching matrix to signal pulse registers 13 and the temporary memory. Having received the sending set number and the instructions, the operator then actuates the dial pulse device at the operator's position to supply signal pulses identifying the sending set to the signal pulse registers for registration and simultaneously therewith the special instructions are stored in the temporary memory. Thereafter the operator at the operator's position returns the telephone set thereat to on-hook. This interrupts the talking circuit from the operator's telephone set to trunk 10, and thereby to the sending set. The computer responsive to the completion of the storage of the sending set identifying signal pulses in the signal pulse registers and the storage of the special instructions in the temporary memory activates the switching matrix to disconnect the operator's position from the signal pulse registers and the temporary memory, and at the same time to disconnect the signal pulse registers from trunk 10. This completes the function of the operator's position for the one semi-automatic operation of FIG. 1 as used in either one of FIGS. 2 and 3. Otherwise, the operation of FIG. 1 is precisely that as hereinbefore explained for the automatic operation.

SECOND TYPE OF SEMI-AUTOMATIC SENDING OF VOICEGRAM FROM SENDING SET TO RECEIVING SET

The arrangement provided in FIG. 1, described above for the one semi-automatic operation of the voicegram service center, may also be utilized in FIG. 2 or 3 for a second type of semi-automatic operation. The second type is useful where the telephone central offices are not arranged to receive the afore-noted prefix digits. In this case the sending set initially dials a predetermined number of signal pulses related to a seven or 10 digit code number which represents the telephone number of the voicegram service center. These pulses energize trunk 10 to provide a ringing signal thereon. Upon receipt of the ringing signal from trunk 10 (which is now essentially an incoming subscriber's line) the computer activates the switching matrix to connect the operator's position to trunk 10, the signal pulse registers and the temporary memory. The operator's position telephone set goes off-hook thereby completing a talking circuit from the latter set via the switching matrix, trunk 10 and central office 35 to the sending set.

This talking circuit enables an operator at the operator's position to request from the party at the sending set the telephone numbers of the receiving and sending sets. The operator then activates the dial pulse device to store signal pulses corresponding to the numbers of both sets in the signal pulse registers.

The operator then requests special instructions from the party at the sending set relative to the class of message as heretofore described. Upon receiving such instructions the operator actuates the dial pulsing device to store them in the temporary memory. Thereafter, the operator returns the operator's position telephone set to on-hook. The computer responsive to the completion of the storage of the receiving and sending set numbers in the signal pulse registers and the storage of the special instructions in the temporary memory activates the switching matrix to disconnect the operator's position from the pulse code registers, trunk 10 and the temporary memory. This completes the function of the operator's position in FIG. 1 for the second type of semi-automatic operation. Subsequently, the operation of FIG. 1 is the same as hereinbefore explained for the automatic operation.

DELIVERY OF VOICEGRAM FROM SENDING SET TO PARTICULAR ADDRESSEE AT RECEIVING SET

According to a third modification of FIG. 1, this circuit as used with either FIG. 2 or 3 enables an operator at the operator's position to verify a particular addressee to whom the reproduction voicegram is to be delivered at the preselected receiving set before it is actually released from the recorder-reproducer for delivery thereto.

When the sending party speaks the voicegram into the sending set as above mentioned, such party prefaces the voicegram with the name of a particular addressee to whom it is to be delivered at the receiving set. At the time of but before the delivery of the reproduction voicegram to the receiving set, the computer responsive to an instruction from the temporary memory relative to the class of message, viz., a particular addressee at the preselected receiving set, activates the switching matrix to connect the operator's position. This enables an operator at the operator's position to the recorder-reproducer under control of the operator's position to listen to the name of the particular addressee to whom the reproduction voicegram is to be delivered. Thereupon, the operator delays the activation of the switching matrix to connect the recorder-reproducer into the talking circuit including the receiving set as above traced under the automatic delivery until a verification of the identity of the particular addressee is effected. Upon satisfactory verification, the operator further activates the recorder-reproducer through the switching matrix to return to the beginning of the recorded voicegram and then to deliver the reproduction voicegram to the verified, particular addressee then available at the receiving set, and disconnects the operator's position from the talking circuit before the delivery of the reproduction voicegram. On the other hand, if the particular addressee were not available at the receiving set at the moment, the operator functions to withhold delivery of the reproduction voicegram therefrom at this time. This is repeated under control of the computer, which is programmed to make additional attempts to deliver the voicegram reproduction at preassigned time intervals until the particular addressee is available at the receiving set to accept delivery of the reproduction voicegram, or until a predetermined time period has expired.

AUTOMATIC TRANSMISSION OF SPECIAL INSTRUCTIONS FOR DELIVERY OF VOICEGRAM

Figure 4:
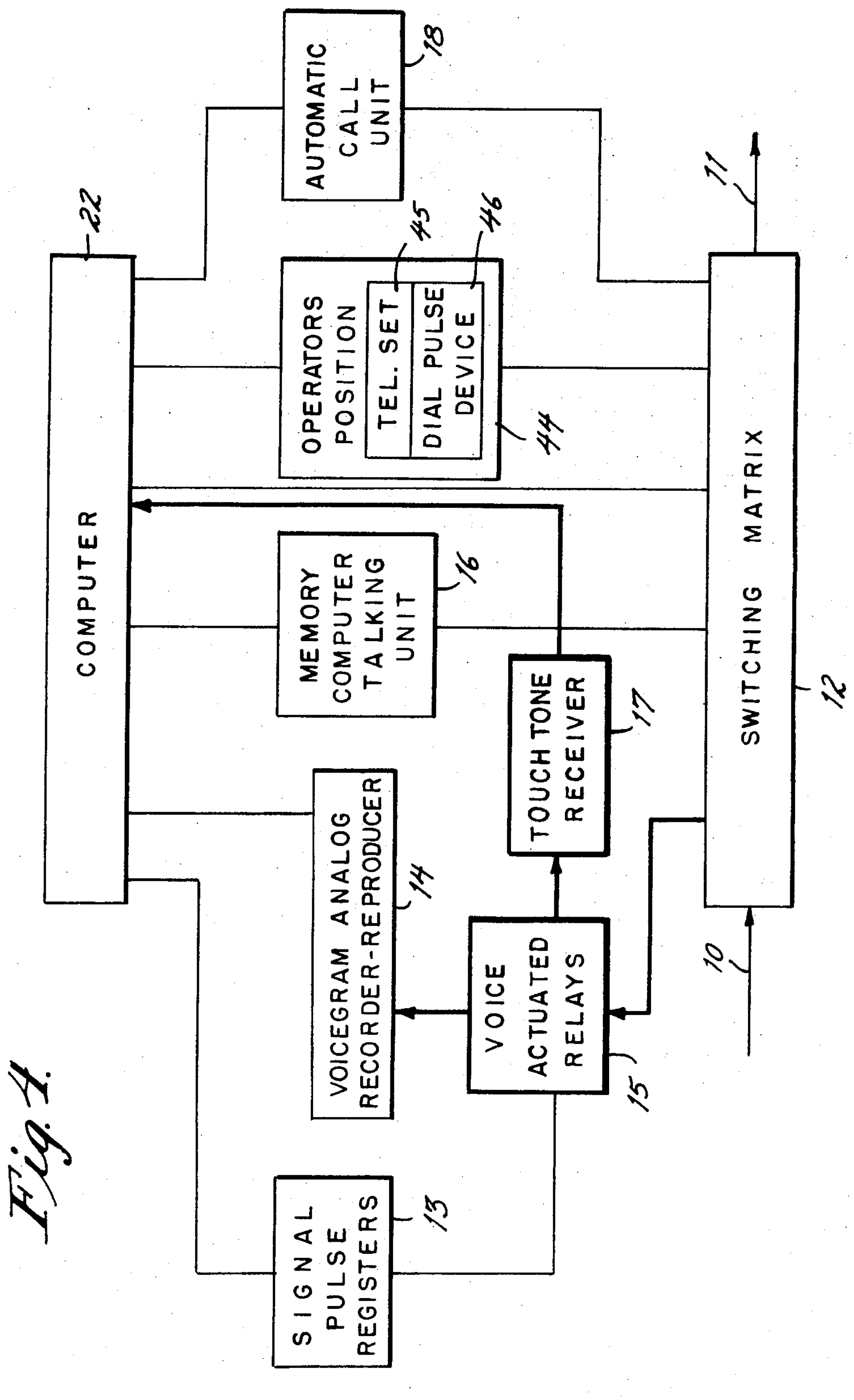
FIG. 4 is a block diagram of voice frequency equipment usable with FIGS. 1, 2 and 3.

FIG. 4 illustrates a fourth modification of FIG. 1 as used in FIG. 2 or 3 to include voice actuated relays 15 and a touch-tone receiver 17.

The touch-tone receiver is similar to the touch-tone receiver in the originating register of the No. 5 Crossbar Apparatus as used in the Bell Telephone System, and manufactured by the Western Electric Company, and the voice actuated relays may be of a type described in an article entitled "Functional Design of a Voice Switched Speaker Phone," By W. F. Clemency and W. D. Goodale and published in the Bell System Technical Journal, Volume 40, page 649, May, 1961.

This replaces the operator's position for requesting and storing special instructions to accompany the voicegram in the automatic sending of a voicegram from the sending set to the voicegram service center as hereinbefore explained. Normally, the touch-tone receiver is connected on-trunk through the voice actuated relays to receive instructions as indicated below when the talking circuit is effective via trunk 10 between the sending set and the switching matrix at the voicegram service center. In FIG. 1 as modified in FIG. 4 and used with FIG. 2 or 3, the sending set is a touch-tone dial pulse type for transmitting different instructions in terms of different digital codes, each instruction represented by one code.

According to the operation of FIGS. 1, 2, 3 and 4, the sending set is connected via the talking circuit previously described and including trunk 10, the central office and/or the central and switching offices, and the switching matrix to the memory computer talking unit at the voicegram service center. For the operation, the memory computer talking unit is provided with a third recording, viz., "This is your voicegram service center, please advise by touch-tone signals special instructions to accompany the delivery of your voicegram upon the sound of the next tone." This recording is sent on the talking circuit before the first one of the two recordings of the memory computer talking unit is sent for the purpose above mentioned. Representative instructions may comprise the following two-digit codes: (a) 1, 1 immediate delivery; (b) 1, 2 night letter; (c) 1, 3 deliver at a definite time (1, 3 + 4 digits identifying a definite time, the four digits signifying the time, e.g., 13.25 hours); (d) 8, 8 a particular person, and (e) 0, 0 request for operator's position for other instructions. These codes except for the "request for operator" are sent on the first talking circuit as above noted under the automatic sending of the voicegram and stored in the temporary memory for read out to and use by the program memory as required. The request for the operator's position receives immediate response whereby the operator's position is connected to the above-noted talking circuit traced under automatic sending.

Upon completion of the storing of the special instructions in the temporary memory, the computer activates the switching matrix to connect the touch-tone sending set via the voice actuated relays to the recorder-reproducer. The touch-tone receiver is thus normally connected to the touch-tone sending set when the latter is not transmitting a voice signal as above noted. It is a function of the voice operated relays to recognize instantly incoming voice signals and thereupon immediately transfer the normal connection from the touch-tone receiver to the recorder-reproducer for recording the voicegram as hereinbefore explained. As soon as the sender ceases to talk (e.g., a mistake is made), the sending set is automatically transferred from the recorder-reproducer back to the touch-tone receiver, whereupon the sender of the voicegram at the sending set may now issue any of the following additional digital instructions to control the recording operation of the recorder-reproducer: digit 4 - stop; digits 4, 1 - replay voicegram; 4, 2 - reverse until digit 4 is dialed; digits 4, 0 - record from here on; digits 4, 4 - cancel message; and digits 4, 5 - o.k., send message.

DELIVERY OF RECORDED REPLICA OF VOICEGRAM REPRODUCTION TO SENDER AND RECEIVER

As the voicegram is being reproduced for delivery to the preselected receiving set, the program memory having received the special instruction to make a cassette copy as read out from the temporary memory, the program memory activates the switching matrix to connect a cassette recording unit to the recorder-reproducer. This enables the cassette recording unit to produce replicas of the reproduction voicegram as delivered to the receiving set, together with all information pertaining thereto as hereinbefore mentioned for the sending and receiving sets. A cassette and a cassette recording system are described in "The Compact-Cassette System for Audio Tape Recordings" by L. F. Ottens and published in the 31st Convention Record, October 10 – 14, 1966, of the Audio Engineering Society and in "A Tape Cassette Standard" by Edward R. Hanson in the Journal of the Audio Engineering Society, October, 1968.

It is understood that the invention herein is described in such respects as are illustrative of the operation thereof. Numerous other arrangements may be devised by those skilled in the art without departing from the spirit and scope of the invention.

What is claimed is:

1. In combination with a telephone system including a sending subscriber's telephone set, sending telephone central office means, receiving telephone central office means, and a receiving subscriber's telephone set:

voicegram service center means disposed between said sending and receiving central office means and responsive to a predetermined number of signal pulses originating at said sending set to interconnect said sending set, said sending central office means and said service center means in a first talking circuit to transmit thereon a voicegram originating at said sending set for recording as an analog signal in said service center means for a first time length; and thereafter said service center means responsive to program instructions stored therein after completion of said voicegram recording and further responsive to said signal pulses to interconnect said service center means, said receiving central office means and said receiving set in a second talking circuit and then to derive a voice reproduction of said voicegram from said analog signal and to deliver said derived reproduction voicegram on said second talking circuit to said receiving set for a second time length; said combination at the same time producing information pertaining to said voicegram recording time and said reproduction voicegram delivery time, including: identifying numbers of said respective sending and receiving sets, said first time length of said voicegram recording, originating time and date of said sending set voicegram, delivery time and date of said reproduction voicegram, said second time length of said reproduction voicegram delivery, and class of said voicegram for computing a charge to said sending set of the cost of said voicegram recording and said reproduction voicegram delivery.

2. The combination according to claim 1 in which said predetermined number of signal pulses includes a prefix number of signal pulses corresponding to at least two digits for arranging to connect said sending set through sending central office means to said service center means.

3. The combination according to claim 2 in which said sending central office means includes a telephone trunk and said sending central office means is activated by said prefix signal pulses to select said trunk to connect said sending set through said sending central office means on said trunk in said first talking circuit to said service center means.

4. The combination according to claim 3 in which said predetermined number of signal pulses includes other signal pulses sent after said prefix signal pulses for identifying said receiving set; and said sending central office means includes register-sender means for storing said other signal pulses and also for automatically storing further signal pulses identifying said sending set.

5. The combination according to claim 4 in which said service center means includes:

a switching matrix;

a temporary memory;

signal pulse registers;

an operator's position; and a computer;

said computer responsive to said trunk selection activates said switching matrix to connect said trunk to said signal pulse registers whereupon said register-sender means automatically transmits on said trunk said other and further stored signal pulses to said signal pulse registers for storage therein; said sending central office means automatically responsive to the completion of the transmission of said other and further signal pulses disconnects said register-sender means from said trunk and thereafter connects said sending set through said sending central office means on said trunk to said switching matrix; said computer recognizing a voicegram is about to be recorded connects said operator's position, temporary memory and switching matrix to said trunk in said first talking circuit; said sending set being off-hook and including a party responsive to a verbal request originating with an operator at said operator's position at off-hook and transmitted in said last-mentioned first talking circuit for special instructions concerning the delivery of said derived voicegram reproduction to said receiving set transmits at least one of said instructions in said last-mentioned first talking circuit to said operator's position for storing thereby in said temporary memory before said voicegram is transmitted and thereafter said operator's position goes on-hook, whereupon said computer responsive to said operator's position on-hook activates said switching matrix to disconnect said operator's position from said last-mentioned first talking circuit.

6. The combination according to claim 5 in which said service center means includes:

a memory talking unit including a prerecorded voice statement consisting of: "This is your voicegram service center; begin speaking your voicegram into your telephone set after the sound of the next tone"; and a voice analog recorder-reproducer;

said computer responsive to said storing of said one special instruction in said temporary memory before said voicegram is transmitted provides sequential activation of said switching matrix to connect said signal pulse registers to said recorder-reproducer to read out said respective other and further signal pulses from said signal pulse registers for storage in said recorder-reproducer and in said temporary memory, to disconnect said signal pulse registers from said trunk and said temporary memory from said switching matrix, and to connect said talking unit to said trunk in said first talking circuit.

7. The combination according to claim 6 in which said computer includes a program memory for activating said memory talking unit to transmit said prerecorded statement thereof in said first talking circuit to said sending set whereupon at the conclusion of said statement said computer activates said switching matrix to disconnect said memory talking unit from said trunk and at the same time to connect said recorder-reproducer to said trunk in said first talking circuit and said temporary memory to said recorder-reproducer; said computer also activating said temporary memory to transfer said one instruction therefrom to said recorder-reproducer; said sending party at the sound of said tone in said prerecorded talking unit statement begins speaking into said sending set said voicegram which is transmitted on said first talking circuit to said recorder-reproducer for recording therein as said analog signal so that upon the completion of said voicegram speaking said sending party returns said sending set to on-hook to interrupt said first talking circuit, whereupon said computer activates said switching matrix to disconnect said recorder-reproducer from said trunk.

8. The combination according to claim 7 in which:

said memory talking unit includes a second prerecorded statement containing: "This is your voicegram service center; we have a voicegram which will be repeated until you hang up";

said program memory activates said temporary memory to read out said other and further signal pulses stored therein into said program memory;

said service center means includes an automatic call unit;

and said receiving central office means includes a receiving telephone line;

said computer activates said switching matrix to select said line and to connect said call unit to said line and said program memory whereupon said line returns dial tone thereon; said call unit responsive to said dial tone reads out said other signal pulses from said program memory for transmission thereby on said line through said receiving central office means to energize said receiving set to indicate a call incoming thereto, whereupon said receiving set goes off-hook to send an off-hook signal from said receiving central office means on said line to said computer to connect said computer, switching matrix, receiving central office means on said line and receiving set in said second talking circuit; said receiving central office means responsive to said receiving set off-hook signal starts said voicegram reproduction delivery time in said computer for computing the charge of said cost to said sending set; said computer responsive to said last-mentioned off-hook signal activates said switching matrix to connect said memory talking unit to said last-mentioned second talking circuit to transmit therein said second prerecorded statement to said receiving set whereupon said computer sequentially activates said switching matrix to disconnect said talking unit from said line, and at the same time to connect said recorder-reproducer to said line and thereby to said last-mentioned second talking circuit; said program memory activates said recorder-reproducer to transmit said derived reproduction voicegram at least once for hearing at said receiving set as a party thereat indicates satisfaction with said reproduction voicegram by restoring said receiving set to on-hook, whereupon said receiving central office means responsive to a receiving set on-hook signal terminates said voicegram reproduction delivery time in said computer for computing the charge of said cost to said sending set; said computer responsive to said last-mentioned on-hook signal activates said switching matrix to disconnect said recorder-reproducer from said line to interrupt said second talking circuit.

9. The combination according to claim 8 in which said computer includes a journal memory activated by said program memory to record said information pertaining to said voicegram recording and said reproduction voicegram delivery and including: said respective numbers of said sending and receiving sets, said originating time and date of said sending set voicegram, said first time length of said voicegram recording, said time and date of delivery of said reproduction voicegram, said second time length required to deliver said reproduction voicegram to said receiving set, and said class of said voicegram.

10. The combination according to claim 9 in which said computer includes a billing memory and a logic unit; said program memory actuating said journal memory to transfer said information recorded therein to said billing memory and to said logic unit to produce at said billing memory said last-mentioned information together with the computed charge of said cost to said sending set of said voicegram recording and said reproduction voicegram delivery.

11. The combination according to claim 1 in which said voicegram and said reproduction voicegram comprise spoken words transmitted and received by said sending set and said receiving set, respectively.

12. The combination according to claim 1 in which said voicegram and said reproduction voicegram comprise data transmitted and received by said sending set and said receiving set, respectively.

13. The combination according to claim 3 in which:

said predetermined number of signal pulses includes additional signal pulses sent immediately after said prefix signal pulses for identifying said receiving set;

said sending central office means includes register-sender means for storing said additional signal pulses;

said service center means includes:

a switching matrix;

signal pulse registers;

an operator's position having a telephone set; and a computer;

said computer responsive to said trunk selection activates said switching matrix to connect said trunk to said signal pulse registers in said first talking circuit whereupon said register-sender means automatically transmits on said trunk said additional signal pulses to said signal pulse registers for storage therein; said computer responsive to the completion of the storage of said additional signal pulses in said signal pulse registers activates said switching matrix to connect said operator's position to said trunk and to said signal pulse registers in said first talking circuit for enabling said operator's position to go off-hook to request vocally from said sending set the identifying number thereof whereupon said operator's position vocally receiving said last-mentioned number activates said set thereat to store in said signal pulse registers signal pulses corresponding to said sending set identifying number; thereafter said operator's position going on-hook is disconnected from said trunk and thereby from said sending set; said computer responsive to the completion of the storage of said sending set identifying signal pulses in said signal pulse registers activates said switching matrix to disconnect said operator's position from said signal pulse registers and at the same time to disconnect said signal pulse registers from said trunk.

14. The combination according to claim 1 in which:

said sending central office means includes a telephone trunk providing a ringing signal in response to said predetermined signal pulses;

said service center means including:

a switching matrix;

signal pulse registers;

an operator's position having a telephone set; and a computer; said computer responsive to said trunk ringing signal activates said switching matrix to connect said operator's position to said trunk and said registers whereupon said operator's set goes off-hook and is thereby connected to said sending set in said first taking circuit; said operator's position utilizing said set thereat to request vocally the respective numbers of said sending and receiving sets from said sending set and after vocally receiving said last-mentioned numbers actuates said operator's position set to store in said registers signal pulses corresponding to said respective sending and receiving set numbers whereupon said operator's position set goes on-hook; said computer responsive to said operator's position set on-hook activates said switching matrix to disconnect said operator's position from said trunk and said registers.

15. The combination according to claim 10 in which said service center means includes said operator's position having a telephone set and in which said voicegram spoken into said sending set is prefaced with said one instruction stored in said recorder-reproducer and stating the name of a particular party to whom said reproduction voicegram is to be delivered at said receiving set; whereby at the time of but before the delivery of said reproduction voicegram to said receiving set said computer activates said switching matrix to connect said operator's position to said recorder-reproducer in said second talking circuit to enable said operator's position set to listen to said particular party's name so that said operator's position set is enabled to activate said switching means to control said recorder-reproducer to hold up delivery of said reproduction voicegram therefrom until said operator's position verifies the identify of said particular party at said receiving set; said operator's position responsive to satisfactory identification of said last-mentioned party activates said switching matrix to remove said delivery hold-up from said recorder-reproducer to enable said recorder-reproducer to transmit said reproduction voicegram to said particular party at said receiving set.

16. The combination according to claim 1 in which:

said sending set provides a plurality of two-digit touch-tone dial signals for specifying a plurality of corresponding instructions regarding said voicegram;

said service means includes:

a recorder-reproducer sequentially connected to said first talking circuit for recording said voicegram as transmitted therein and to said second talking circuit for delivering said reproduction voicegram thereto;

a switching matrix;

a computer;

a memory talking unit having a recording "This is your voicegram service center; please advise by touch-tone signals any special instructions that are to accompany the delivery of your voicegram upon the sound of the next tone";

voice actuated relays connectable to said recorder-reproducer; and a touch-tone receiver connectable to said computer and normally connected through said relays to said switching matrix and thereby to said first talking circuit; said computer activating said switching matrix to connect said memory talking unit to said first talking circuit for delivering said recording in said unit to said sending whereupon said sending set functions to transmit one of said two-digit touch-tone signals on said first talking circuit to specify a corresponding one instruction to precede said voicegram recording in said recorder-reproducer; said one instruction two-digit touch-tone signal transmitted from said sending set in said first talking circuit through said relays and receiver for storage in said computer to control the delivery operation of said recorder-reproducer as connected to said second talking circuit; said computer responsive to said stored one instruction therein for activating said switching matrix to connect said first talking circuit to said relays and thereby to said recorder-reproducer for recording therein said voicegram originating at said sending set; said sending set further functions to transmit an additional one of said two-digit touch-tone signals on said first talking circuit to specify an additional corresponding one instruction representing a preselected one of a plurality of controls including stop, replay, cancel all of said voicegram, cancel part of said voicegram, proceed with said voicegram, and operator assistance for controlling the recording operation of said recorder-reproducer as connected to said first talking circuit.

17. The combination according to claim 5 in which said one instruction requires the recording of a replica of said reproduction voicegram as delivered to said receiving set; said one instruction transmitted in said first talking circuit for storage in said temporary memory; and said service center includes a cassette recording unit; said computer responsive to said one instruction stored in said temporary memory activates said switching matrix to connect said cassette recording unit to said second talking circuit to record said replica of said reproduction voicegram as delivered to said receiving set.

18. In a voicegram service center connecting a sending telephone set identified with one number and a receiving telephone set identified with a different number, the method of delivering a voicegram of preassigned class originating at said sending set and recorded at said service center as a reproduction voicegram derived from said service center recorded voicegram to said receiving set while simultaneously therewith producing information for computing a charge to said sending set of the cost of said recorded voicegram and said delivered reproduction voicegram, which method consists of:

recording at said service center said voicegram originating at said sending set in a sending circuit preselected by said sending set for connecting said sending set to said service center at a recording starting time and interrupting said circuit at a recording terminating time to determine a voicegram recording time length as the difference between said starting and terminating times;

delivering a reproduction voicegram derived from said recorded voicegram at said service center to said receiving set in a receiving circuit preselected by said sending set for connecting said service center to said receiving set at a delivery starting time and interrupting said receiving circuit at a delivery terminating time to determine a reproduction voicegram delivery time length as the difference between said delivery starting and delivery terminating times; and producing concomitantly with said respective voicegram recording and reproduction voicegram delivery time lengths information including said identifying numbers of said sending and receiving sets, said voicegram recording time length, time of day and date of said voicegram recording, delivery time of day and date of said reproduction voicegram, said reproduction voicegram delivery time length, and said voicegram class for computing a charge to said sending set of the cost of said voicegram recording and said reproduction voicegram delivery.

19. The method according to claim 18 which includes the step of utilizing at said service center an instruction originating at said sending set and recorded at said service center before said voicegram recording thereat for controlling the delivery of said reproduction voicegram from said service center to said receiving set.

20. The method according to claim 18 which includes the step of utilizing at said service center an instruction originating at said sending set during said voicegram recording at said service center for controlling said voicegram recording thereat.

21. The method according to claim 18 which includes the step of utilizing at said service center an instruction originating at said sending set and recorded at said service center before said voicegram recording thereat for producing at said service center a replica of said reproduction voicegram as delivered from said service center to said receiving set.

22. The combination according to claim 13 in which said service center means includes a temporary memory; said computer at the same time of activating said switching matrix to connect said operator's position to said signal pulse registers also activates said switching matrix to connect said operator's position to said temporary memory; whereupon said operator's position still at said off-hook also requests from said sending set special instructions concerning the delivery of said reproduction voicegram to said receiving set and after receiving at least one of said instructions from said sending set said operator's position actuates said set thereat to store said one instruction in said temporary memory before said voicegram is transmitted and thereafter said operator's position telephone set goes said on-hook; said computer further responsive to the storage of said one special instruction in said temporary memory also activates said switching matrix to disconnect said operator's position from said temporary memory.

23. The combination according to claim 14 in which said service center means includes a temporary memory; said computer at the same time of activating said switching matrix to connect said operator's position to said signal pulse registers also activates said switching matrix to connect said operator's position to said temporary memory; whereupon said operator's position still at said off-hook also requests from said sending set special instructions concerning the delivery of said reproduction voicegram to said receiving set and after receiving at least one of said instructions from said sending set said operator's position actuates said set thereat to store said one instruction in said temporary memory before said voicegram is transmitted and thereafter said operator's position goes said on-hook; said computer responsive to the storage of said one special instruction in said temporary memory also activates said switching matrix to disconnect said operator's position from said temporary memory.

24. In a voicegram telephone system a sending subscriber's telephone set; sending telephone central office means; receiving telephone central office means; a receiving subscriber's telephone set; and voicegram service center means including a voice analog recorder-reproducer and responsive to a predetermined number of signal pulses originating at sending set to interconnect said sending set, said sending central office means and said service center means in a first talking circuit to transmit thereon a voicegram originating at said sending set for recording as an analog signal in said recorder-reproducer for a first time length; and thereafter said service center means responsive to program instructions stored therein after the completion of said voicegram recording in said recorder-reproducer and further responsive to said signal pulses to interconnect said service center means, said receiving central office means and receiving set in a second talking circuit and then to derive a voice reproduction of said voicegram from said analog signal in said recorder-reproducer and to deliver said reproduction voicegram in said second talking circuit to said receiving set for a second time length; said system at the same time producing information pertaining to said voicegram recording time and said reproduction voicegram delivery time, including: identifying numbers of said respective sending and receiving sets, said first time length of said voicegram recording, originating time and date of said sending set voicegram, delivery time and date of said reproduction voicegram, said second time length of said reproduction voicegram delivery, and class of said voicegram for computing a charge to said sending set of the cost of said voicegram recording and said reproduction voicegram delivery.

25. The system according to claim 24 in which said sending office means includes: a telephone trunk, and register-sender means; said sending office responsive to a prefix number of said predetermined signal pulses for selecting said trunk to connect said sending set in said first talking circuit and for activating said register-sender means to store other signal pulses sent after said prefix signal pulses to identify said receiving set and to store automatically further signal pulses to identify said sending set.

26. The system according to claim 25 in which said service center means includes: signal pulse registers, a switching matrix, and a computer; said computer responsive to said trunk selection activates said switching matrix to connect said trunk to said signal pulse registers whereupon said register-sender means automatically transmits said other and further pulses therefrom on said trunk to said signal pulse registers for storage therein and upon completion of said last-mentioned storage disconnects said trunk from said signal pulse registers and thereafter connects said sending set, said trunk and said switching matrix in said first talking circuit.

27. The system according to claim 26 in which said computer and said service center means include a temporary memory and an operator's position, respectively; said computer recognizing a voicegram is about to be recorded connects said operator's position to said temporary memory and to said switching matrix and thereby to said trunk in said first talking circuit; said sending set being off-hook and including a party responsive to a verbal request originating with an operator at said operator's position at said off-hook and transmitted in said last-mentioned first talking circuit for special instructions concerning the delivery of said reproduction voicegram to said receiving set transmits at least one of said instructions in said last-mentioned first talking circuit to said operator's position for storage thereby in said temporary memory before said voicegram is transmitted by said sending set; thereafter said operator's position goes on-hook so that said computer activates said switching matrix to disconnect said operator's position therefrom and to connect said signal pulse registers to said recorder-reproducer to read out said stored other and further signal pulses identifying said sending and receiving sets, respectively, from said signal pulse registers into said recorder-reproducer and said temporary memory, whereupon said computer activates said switching matrix to disconnect said signal pulse registers and said temporary memory therefrom.

28. The system according to claim 27 in which said service center means includes a memory talking unit containing a prerecorded voice statement consisting of: "This is your voicegram service center; begin speaking your voicegram into your telephone set after the sound of the next tone"; said computer activates said switching matrix to connect said unit to said trunk in said first talking circuit whereupon said unit announces therein said statement after which said computer activates said switching matrix to disconnect said unit from said truck and at the same time to connect said recorder-reproducer to said trunk in said first calling circuit to establish a starting time for said voicegram recording of said recorder-reproducer and to connect said temporary memory to said recorder-reproducer; said sending party at the sound of said statement tone begins speaking into said sending set said voicegram which is transmitted on said trunk in said first talking circuit to said recorder-reproducer for recording therein as said analog signal so that upon the completion of said speaking voicegram said sending set goes on-hook to interrupt said first talking circuit to establish a terminating time for said voicegram recording at said recorder-reproducer whereupon said computer activates said switching matrix to disconnect said recorder-reproducer from said trunk; said computer also activating said temporary memory to transfer said one instruction therefrom to said recorder-reproducer.

29. The system according to claim 28 in which said computer includes a program memory activating said temporary memory to read out said other and further signal pulses therefrom into said program memory; said receiving central office means includes an outgoing telephone signaling line; and said service center means includes an automatic call unit; said computer activates said switching matrix to connect said call unit to said line and to said program memory whereupon said line sends dial tone thereon to said call unit; said call unit responding to said dial tone reads out said other signal pulses from said program memory for transmission on said line to energize said receiving set, whereupon said receiving set goes off-hook to send an off-hook signal on said line to said computer which responsive to said latter signal establishes therein a starting time for said reproduction voicegram and connects said computer, said switching matrix, said line and said receiving set in said second talking circuit.

30. The system according to claim 29 in which said service center means includes said memory computer talking unit containing a second prerecorded statement consisting of: "This is your voicegram service center; we have a voicegram which will be repeated until you hang up."; said computer activates said switching matrix to connect said talking unit to said line in said last-mentioned talking circuit for transmitting therein said second prerecorded statement to said receiving set whereupon said computer sequentially activates said switching matrix to disconnect said talking unit from said line and at the same time to connect said recorder-reproducer to said line and thereby to said last-mentioned talking circuit; said program memory activates said recorder-reproducer to transmit said derived reproduction voicegram at least once for hearing at said receiving set as a party thereat indicates satisfaction with said reproduction voicegram by restoring said receiving set to on-hook, whereupon said receiving central office means responsive to a receiving set on-hook signal terminates said reproduction voicegram delivery in said computer for computing the charge of said cost to said sending set; said computer responsive to said last-mentioned on-hook signal activates said switching matrix to disconnect said recorder-reproducer from said line to interrupt said last-mentioned talking circuit.

31. The system according to claim 30 in which said computer activates said switching matrix to connect said operator's position to said recorder-reproducer at the time of but before the delivery of said reproduction voicegram to said receiving set to listen to said one instruction stored in said recorder-reproducer to enable said operator's position to control the delivery of said reproduction voicegram to said receiving set in accordance with said one instruction; thereafter said operator's position activates said recorder-reproducer in said second talking circuit to deliver said reproduction voicegram to said receiving set and also activates said switching matrix to disconnect said operator's position from said recorder-reproducer in said second talking circuit before said reproduction voicegram is delivered to said receiving set.

32. The system according to claim 31 in which said computer comprises: a journal memory to record said information pertaining to said voicegram recording and said reproduction voicegram delivery and including: said identifying numbers of said respective sending and receiving sets, said starting and terminating times of said voicegram recording to derive said first time length thereof; said originating time and date of said sending set voicegram, said delivery time and date of said reproduction voicegram, said starting and terminating times of said reproduction voicegram delivery to derive said second time length thereof, and said class of said sending set voicegram; and a billing memory and a logic unit; said program memory activating said journal memory to transfer said information stored therein to said billing memory and said logic unit for producing at said billing memory said last-mentioned information for computing said charge to said sending set of the cost of said voicegram recording and said reproduction voicegram delivery.

33. The system according to claim 30 in which said one instruction stored in said temporary memory requires the recording of a replica of said reproduction voicegram as delivered to said receiving set; and said service center means includes a cassette recording unit; said program memory responsive to said one instruction read thereinto from said temporary memory activates said switching matrix to connect said cassette unit to said recorder-reproducer in said second talking circuit to record said replica of said reproduction voicegram as delivered to said receiving set.

* * * * *